United States Patent
Cv et al.

(10) Patent No.: US 8,165,184 B2
(45) Date of Patent: Apr. 24, 2012

(54) APPARATUS AND METHOD FOR SYNTHESIZING AND GENERATING AN SSC MODULATED SIGNAL

(75) Inventors: Ramachandra Cv, Bangalore (IN); Mark L. Guenther, Portland, OR (US); John C. Calvin, Portland, OR (US)

(73) Assignee: Tektronix, Inc., Beaverton, OR (US)

( * ) Notice: Subject to any disclaimer, the term of this patent is extended or adjusted under 35 U.S.C. 154(b) by 507 days.

(21) Appl. No.: 12/321,379

(22) Filed: Jan. 17, 2009

(65) Prior Publication Data
US 2009/0207886 A1   Aug. 20, 2009

(51) Int. Cl.
*H04B 1/00* (2006.01)
(52) U.S. Cl. .................... 375/130; 375/224
(58) Field of Classification Search ............... 375/130, 375/135, 140, 146, 224
See application file for complete search history.

(56) References Cited

U.S. PATENT DOCUMENTS
2002/0176486 A1 * 11/2002 Okubo et al. ............... 375/146
* cited by examiner

*Primary Examiner* — Curtis Odom
(74) *Attorney, Agent, or Firm* — Thomas F. Lenihan (57) ABSTRACT

An Arbitrary Waveform Generator (AWG) synthesizes and generates an SSC modulated signal by generating a modulating waveform with a frequency of an SSC modulation frequency, calculating the number of samples per data bit (SPUI) as a ratio of an upsampling frequency to a data rate of a data stream, calculating an amplification factor as the ratio of SSC deviation frequency to data rate of the data stream, generating the array of SSC Edges containing the edge variation with respect to single sample per bit, multiplying the amplification factor to the modulating waveform, generating an array of SSC Edges Upsampled, containing edge variations with respect to an Upsample factor per bit, and multiplying SSC Edges with SPUI; calculating the resultant bit duration SSC Bit Duration as the sum of SSC Edges Upsampled and SPU, and calculating the successive summation of SSC Bit Duration, to get SSC Bit Position.

4 Claims, 11 Drawing Sheets

APPARATUS AND METHOD FOR SYNTHESIZING AND GENERATING AN SSC MODULATED SIGNAL

FIELD OF INVENTION

The present invention generally relates to electronic device testing and more particularly to Spread Spectrum Clocking.

BACKGROUND OF THE INVENTION

With shrinking size and increasing accuracy of the electronic systems and devices there is an increased requirement of Electro Magnetic Compatibility (EMC). Various standards such as, the Federal Communications Commission (FCC) regulate the Electro Magnetic Interference levels of such devices. These standards like FCC require that the manufacturer measure the performance of the system for certification.

Serial ATA technology uses the Spread Spectrum Clocking (SSC) where low frequency modulation on the transmitter clock signals is performed with respect to time in a controlled manner. The purpose of this modulation is to spread the spectral energy to mitigate the unintentional interference of radio frequency. A typical modulating frequency may be decided based on factors such that, the frequency does not exhibit more energy on certain peaks, and that the frequency does not interfere with PLL frequency of operation, that is, loop-BW and the modulation spreads the spectral energy content to overcome interference with radio frequency (RF).

Usually, spread spectrum clocking involves dealing with three parameters namely, Modulation Scheme, Modulation depth, and Modulation Frequency.

The two most common Modulation Schemes are linear triangle modulation and a non-linear modulation scheme, according to U.S. patent, commonly known as the Hershey Kiss scheme. The Hershey Kiss™ modulation scheme gains better EMI reduction than the linear triangle scheme.

Modulation depth is the amount of frequency modulation applied to the clock carrier. SATA specification requires 0.5% to 1% down spread modulation. Down spread means that the clock carrier is 1.5 GHz is modulated down to 1.5 GHz-1.5 KHz for value of 0.1%.

Modulation frequency is the repetition rate of the modulation scheme applied to the clock carrier signal. The typical modulating frequency is 33.3 KHz (30 KHz to 90 KHz). On certain peaks, this frequency will not have more energy. It does not interfere with PLL frequency of operation that is Loop-BW and modulation spreads the spectral energy content to overcome interference with RF.

Usually at the physical layer developers and the manufacturing units have large number of device under test (DUTs), which need to be tested. For example in case of a serial technology standard Serial ATA (Serial ATA Revision 2.5 27 Oct. 2005) requires vendors to make their DUT compliant. This may require performance of tests, for example performing PHY-TSG-OOB, RxTx, SI and RSG/RM tests. For carrying out these test procedures there is a need for giving an SSC modulated waveform as an stimuli.

Figure 1:
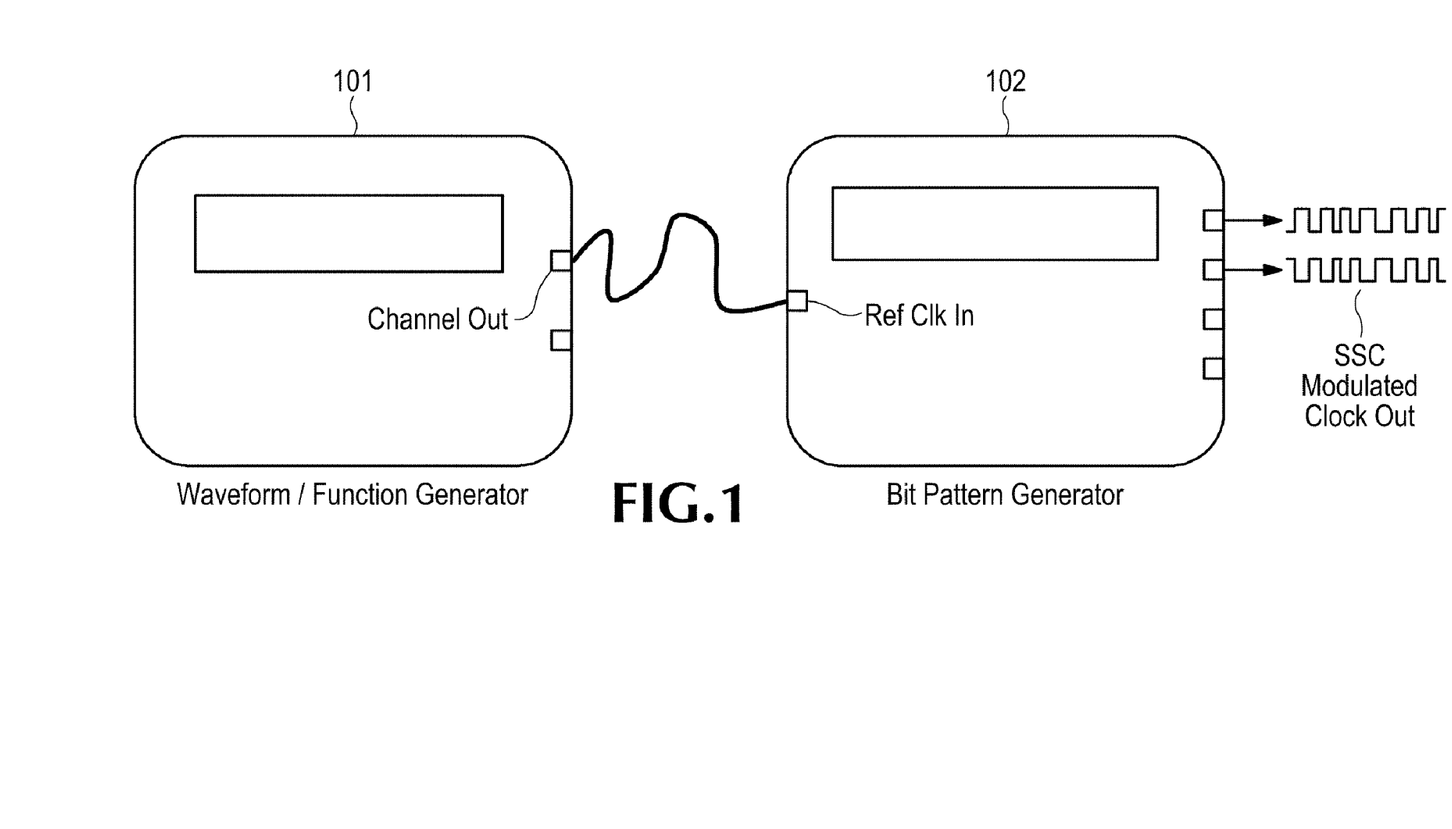
FIG. 1 shows a traditional system and method for generation of a desired SSC modulated output using a bit pattern generator and waveform generator, as known from the prior art.

The traditional solution setup requires two instruments namely a Bit Pattern Generator and an Function/Waveform generator as shown in FIG. 1.

The signal generated by the Function/Waveform generator 101 is used to modulate the internal clock of the Bit pattern generator 102. This signal provides the desired compression and expansion of the output data stream from the bit pattern generator resulting in the generation of a desired SSC modulated output from bit pattern generator output 102*a*.

The three SSC parameters, Modulation scheme, Modulation depth and Modulation Frequency are controlled by the signal generated by the Function/Waveform generator.

However the above system of providing SSC test signal may have various problems associated. The setup is generally complex as the generation of SSC modulated signal needs a Bit pattern generator and Function/Waveform generator. Further, as the data stream of the bit pattern generator is modulated using a signal from the Function/Waveform generator it adds to additional cost to the setup. Also, working with this setup is time consuming, as there is a need to make the systems to work coherently.

Using Agilent BERT, both SSC modulations and Sinusoidal jitter generation cannot be achieved simultaneously.

There is therefore a requirement of a simple yet precise system and method for synthesizing and generating the SSC modulated signal with precision and in a controlled manner.

SUMMARY OF THE INVENTION

System and method for synthesizing and generating the SSC modulated signal with precision and in a controlled manner is provided. In one embodiment the system may be provided integrated in an arbitrary waveform generator.

The method for synthesizing and generating the SSC modulated signal comprises the steps of generating modulating waveform with a frequency of the SSC modulation frequency; calculating the number of samples per data bit (SPUI) as a ratio of upsampling frequency to data rate of data stream; calculating the amplification factor as the ratio of SSC deviation frequency to data rate of the data stream; generating the array of SSC Edges containing the edge variation with respect to single sample per bit, and multiplying the amplification factor to the modulating waveform; generating the array SSC Edges Upsampled, containing the edge variations with respect to Upsample factor per bit, and multiplying SSC Edges with SPUI; calculating the resultant bit duration SSC Bit Duration as the sum of SSC Edges Upsampled and SPUI; calculating the successive summation of SSC Bit Duration, to get SSC Bit Position.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE DRAWINGS

A system and method for synthesizing and generating the SSC modulated signal with precision and in a controlled manner is provided. In one embodiment, the system may be integrated in an arbitrary waveform generator. In another embodiment, the system and method as described may be provided as a standalone application.

In the following description, for purposes of explanation, specific details are set forth in order to provide an understanding of the invention. It will be apparent, however, to one skilled in the art that the invention may be practiced without these details. One skilled in the art will recognize that embodiments of the present invention, some of which are described below, may be incorporated into a number of electronic equipments. Structures and devices shown in the figures are illustrative of exemplary embodiments of the invention and are meant to avoid obscuring the invention. Furthermore, connections between components and/or modules within the figures are not intended to be limited to direct connections. Rather, data between these components and modules may be modified, re-formatted or otherwise changed by intermediary components and modules.

References in the specification to "one embodiment" or "an embodiment" mean that a particular feature, structure, characteristic, or function described in connection with the embodiment is included in at lest one embodiment of the invention. The appearances of the phrase "in one embodiment" in various places in the specification are not necessarily all referring to the same embodiment.

Figure 2A:
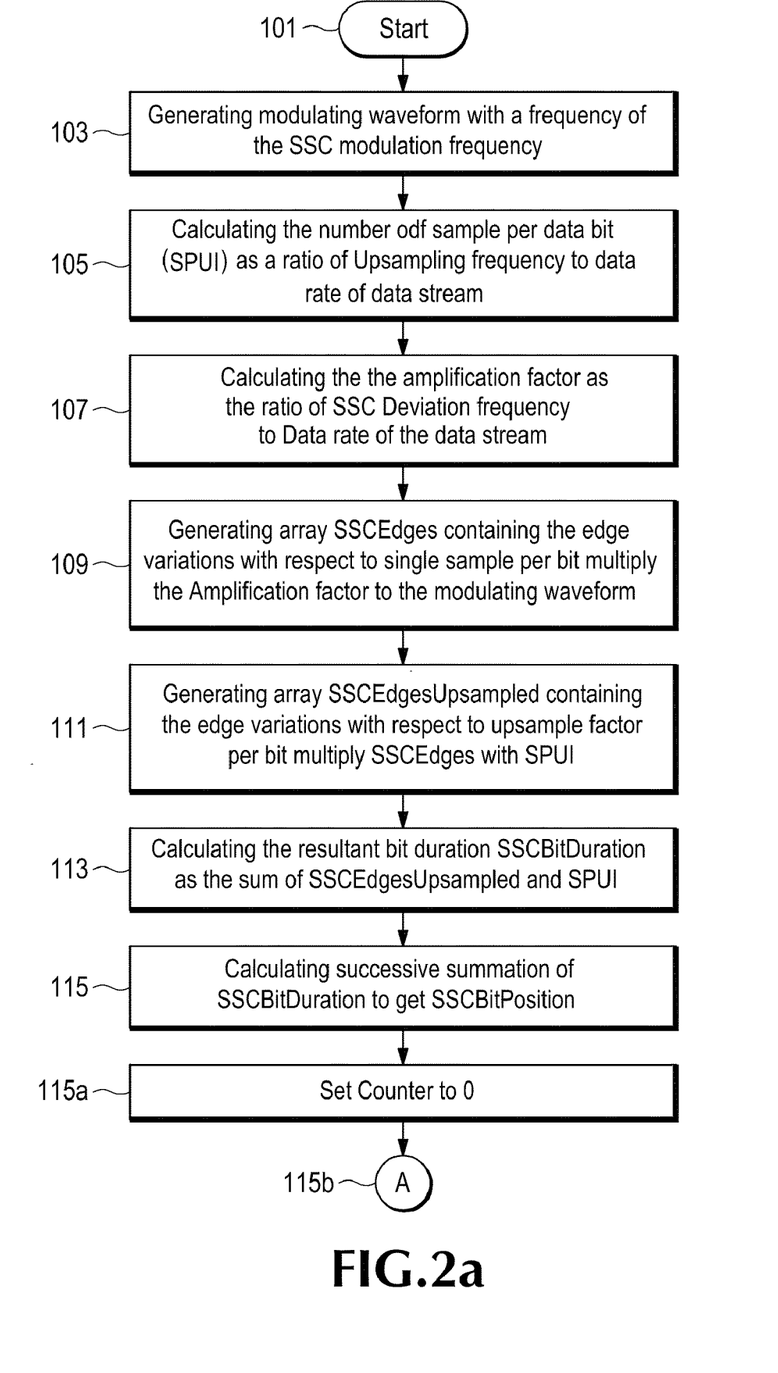
FIGS. 2*a* and 2*b* show the method for generating an SSC waveform as per one embodiment of the present invention.

The method of generating the SSC modulated output for testing of a DUT as per one embodiment of the present invention is explained with reference to FIGS. 2a and 2b.

The method for synthesizing and generating the SSC modulated signal as per one embodiment of the present invention may comprise the steps of generating modulating waveform with a frequency of the SSC modulation frequency. The amplitude of the waveform may be varied. In one exemplary embodiment the Peak to peak amplitude of 2 Volts is provided. Also, the duration of the waveform is equal to one less than the number of samples of the data stream. The sampling frequency equal to the data rate of the data stream may be set.

The above step may be represented by an Equation 1:

Modulating Waveform=Array of Triangular waveform or Non linear waveform     (1)

Figure 3:
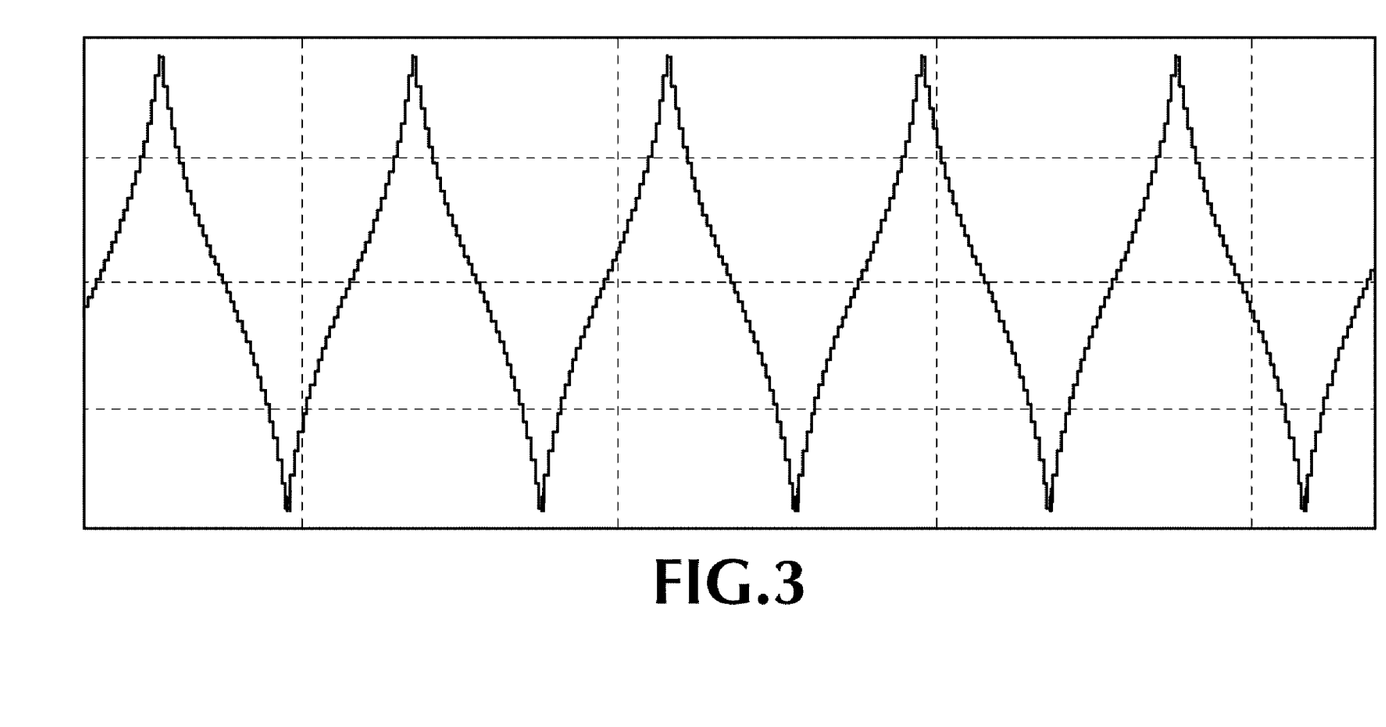
FIG. 3 shows a non-linear SSC modulation scheme used in invention as per one embodiment of the present invention.

Triangular and non-linear modulating waveforms can be used for modulating a data stream to generate linear/non linear SSC waveforms. Modulating waveform is generated based on the linear triangle or non-linear modulation scheme required. Waveforms for non-linear modulation scheme can be generated by taking the tangent of the triangular waveform as shown in FIG. 3.

This modulating frequency when applied to a bit stream, causes a change in the individual bit duration, either an expansion or compression, hence leading to edge variation of the bit edges from their actual position. Each bit in the data stream is represented by a single sample. But, this single sample is not sufficient to represent the compression or the expansion of the individual bits.

Further, the step comprises calculating the number of samples per data bit (SPUI) as a ratio of upsampling frequency to data rate of data stream.

$$SPUI = \text{Upsampling Rate/Data Rate of data stream} \quad (2)$$

Selection of a higher value of SPUI will lead to an increase in the sampling frequency of the system (AWG) and faster transition time. In an exemplary embodiment for SATA Gen 2, the data rate is 3 Gbps and the maximum sampling frequency of the AWG is 20 Gs/s, so 6 is chosen as the SPUI value and the sampling frequency of the AWG is set to 18 Gs/s.

The Modulating Waveform is used to modify the bit duration and therefore its amplitude has to be adjusted, based on the value of SSC deviation frequency. This amplitude is adjusted with an amplification factor termed SscAmpFact. This further step comprises of calculating the amplification factor as the ratio of SSC deviation frequency to data rate of the data stream.

$$SscAmpFact = SSC \text{ Deviation frequency/Data Rate of data stream.} \quad (3)$$

A further step comprises generating the array of SSC Edges (SSCEdges) containing the edge variation with respect to single sample per bit, and multiplying the amplification factor to the modulating waveform. This may be represented by Equation 4.

$$SSCEdges = ModulatingWaveform * SSCAmpFact. \quad (4)$$

The SSCEdges waveform now contains the edge variation of the individual bits in the data stream from its actual position. These edge variations are with reference to a single sample without Upsampling. The further step comprises generating the array SSC Edges Upsampled, containing the edge variations with respect to an Upsample factor per bit, and multiplying SSCEdges with SPUI. The SSCEdges waveform needs to be multiplied by SPUI as the data stream will be Upsampled by a factor of SPUI given by Equation 5.

$$SSCEdges\ Upsampled = SSCEdges * SPUI. \quad (5)$$

A further step comprises calculating the resultant bit duration SSCBitDuration as the sum of SSCEdges Upsampled and SPUI. The SSCEdges Upsampled has edge variation information with respect to Upsampled bit duration. The resultant bit duration of the Upsampled data stream is given by Equation 6.

$$SSCBitDuration = SSCEdges\_Upsampled + SPUI. \quad (6)$$

For example, if the SPUI value is 6 (Bit duration after upsampling), then SSCBitDuration might have the array elements as shown in Table 1.

TABLE 1

| SSC_Bit_Duration | | | | | | | | | | | | | | | | | |
|---|---|---|---|---|---|---|---|---|---|---|---|---|---|---|---|---|---|
| 6 | 5.8 | 5.6 | 5.4 | 5.2 | 5.4 | 5.6 | 5.8 | 6 | 6.2 | 6.4 | 6.6 | 6.8 | 6.6 | 6.4 | 6.2 | 6 | 5.8 |
| Data stream 1 | 0 | 1 | 0 | 1 | 0 | 1 | 0 | 1 | 0 | 1 | 0 | 1 | 0 | 1 | 0 | 1 | 0 |

Further step comprises calculating the successive summation of SSC Bit Duration, to get SSCBitPosition. The successive summation of SSCBitDuration is done to get the actual positions of the edges of the data stream of the SSC waveform as given by Equation 7.

$$SSCBitPosition = Successive\ Summation\ (SSCBitDuration). \quad (7)$$

Considering the same example as in Table 1, the SSCBitPosition array elements will have the values shown in Table 2.

TABLE 2

| SSCBitPosition | | | | | | | | | | | | | | | | | |
|---|---|---|---|---|---|---|---|---|---|---|---|---|---|---|---|---|---|
| 6 | 11.8 | 17.4 | 22.8 | 28 | 33.4 | 39 | 44.8 | 50.8 | 57 | 63.4 | 70 | 76.8 | 83.4 | 89.8 | 96 | 102 | 107.8 |
| Data stream 1 | 0 | 1 | 0 | 1 | 0 | 1 | 0 | 1 | 0 | 1 | 0 | 1 | 0 | 1 | 0 | 1 | 0 |

Each element of the SSCBitPosition waveform indicates the number of times the corresponding element of the data stream is repeated and the non-integral edge transition value. The value of the edge transition depends on the fractional part of SSCBitPosition array element and is calculated using interpolation operation and depends on both the bits causing the transition.

For example, considering Table 2, the first element of Data stream '1' is repeated for 6 times, which is the first element of SSCBitPosition.

The second element of Data stream '0' is repeated for 5 (floor value of 11.8—ceil value of 6) times and the $12^{th}$ position (ceil of 11.8) will have a value 0.2 (1−(11.8—floor of 11.8, the whole divided by 1) based on linear interpolation.

The third element is Data stream '1' is repeated for 5 (floor value of 17.4—ceil value of 11.8) times and the $18^{th}$ position (ceil of 17.4) will have a value 0.4 (17.4—floor of 17.4, the whole divided by 1). This process is explained in FIG. 4 and Table 3.

Figure 2B:
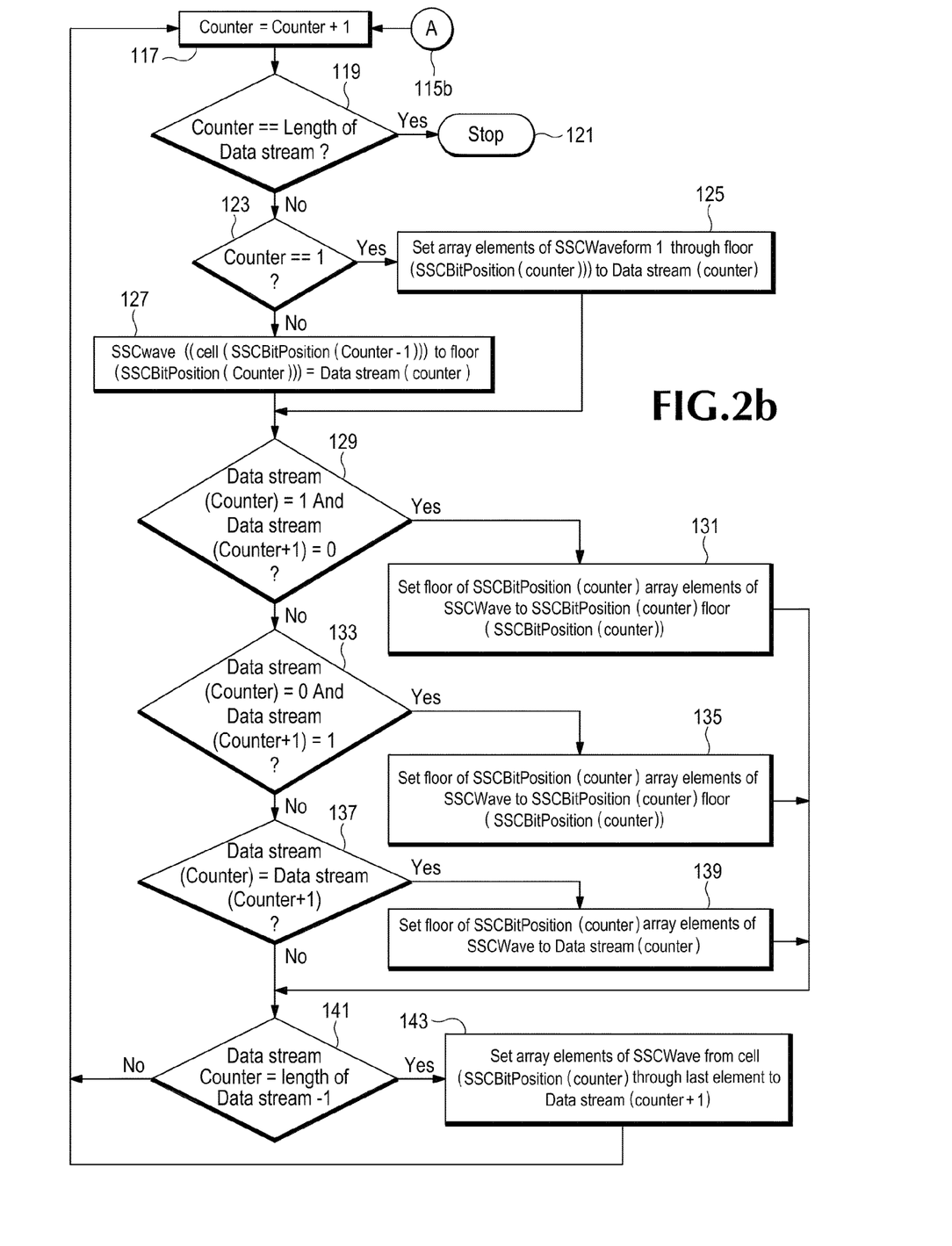

The rule followed may be represented as follows, this is represented in FIG. 2b as per one embodiment of the present invention.

IF transition is from 0 bit to 1 bit,

SSC_Waveform (floor (SSC_Bit_Position (i)))=1−(SSC_Bit_Position (i)−floor (SSC_Bit_Position (i)))     a.

Else

SSC_Waveform (floor (SSC_Bit_Position (i)))=SSC_Bit_Position (i)−floor (SSC_Bit_Position (i))—     a.

TABLE 3

| SSC_Bit_Position | | | | | | | | | | | | | | | | | |
|---|---|---|---|---|---|---|---|---|---|---|---|---|---|---|---|---|---|
| 6 | | | | | | 11.8 | | | | | | 17.4 | | | | | |
| Data stream | | | | | | | | | | | | | | | | | |
| 1 | | | | | | 0 | | | | | | 1 | | | | | |
| SSC Output waveform 1 | 1 | 1 | 1 | 1 | 1 | 0 | 0 | 0 | 0 | 0 | 0.2 | 1 | 1 | 1 | 1 | 1 | 0.4 |

This SSCWaveform waveform is written in the AWG native format file. This file is then loaded onto AWG to generate SSC waveform.

Figure 4:
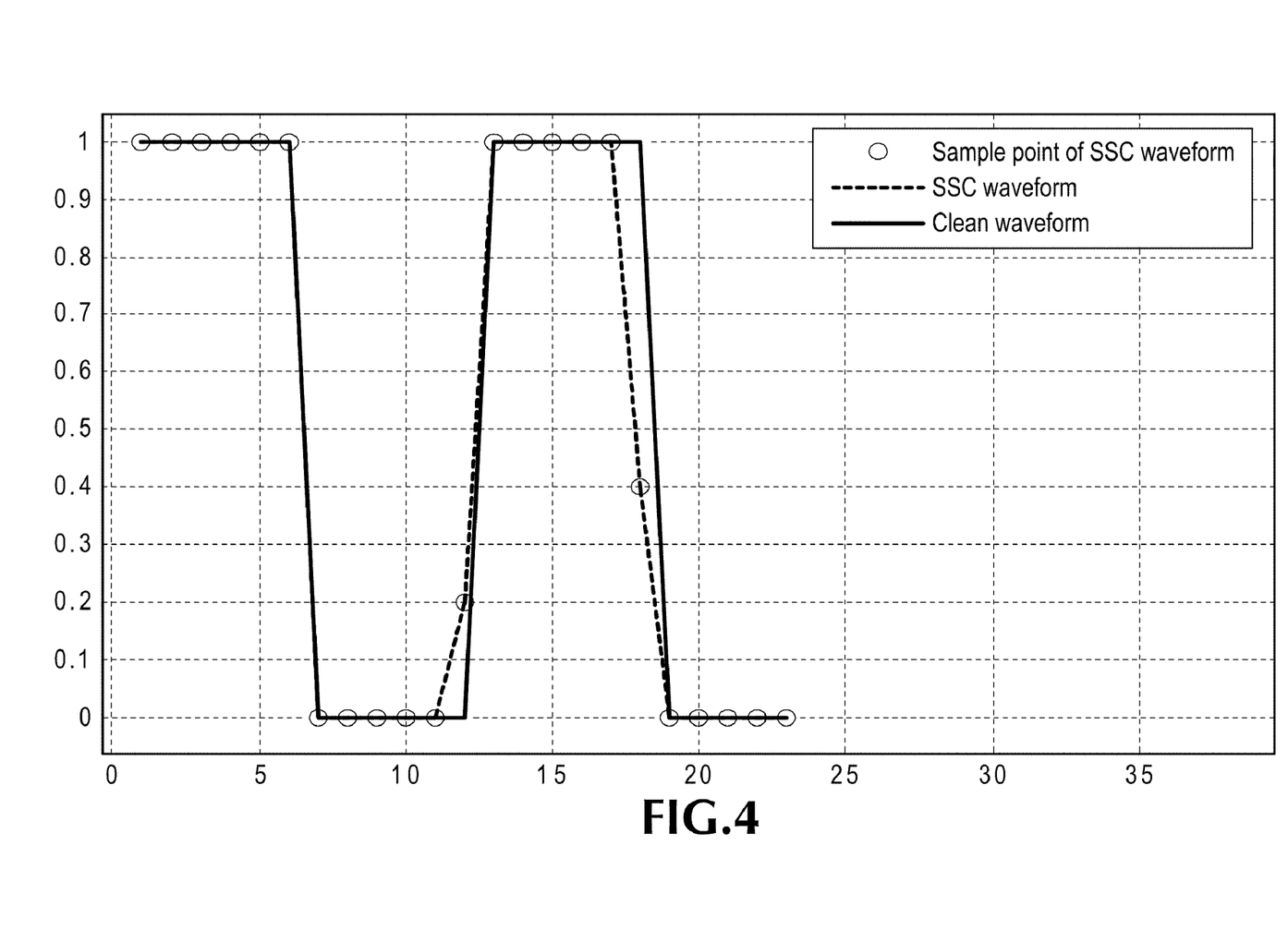
FIG. 4 shows the linear interpolation process used in the invention as per one embodiment of the present invention.
Figure 5:
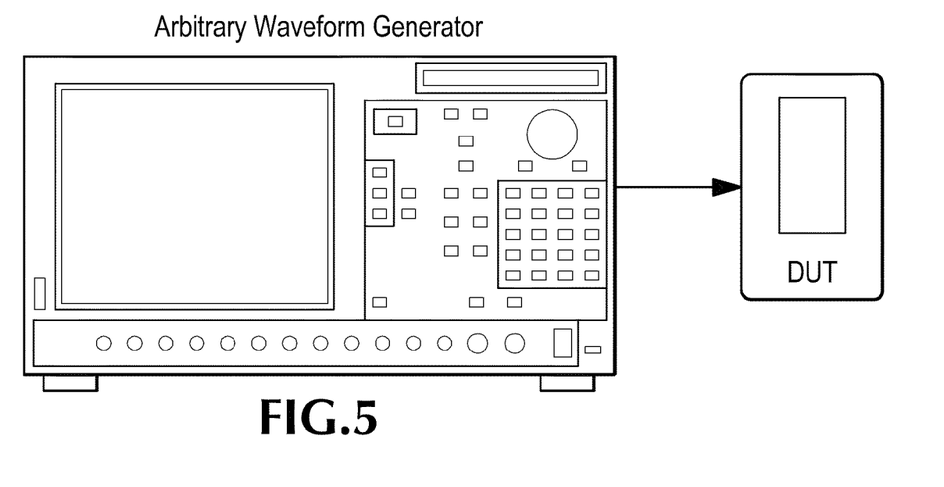
FIG. 5 shows the system for generating an SSC waveform as per one embodiment of the present invention.

The system for generation of SSC waveform as per an embodiment of the present invention is shown in FIG. 4. The arbitrary waveform generator may be configured for performing the method for obtaining SSC waveform as explained above. The arbitrary waveform generator may be connected directly to a device under test (DUT) for providing the SSC modulated input to the DUT for testing of that DUT.

Figure 6:
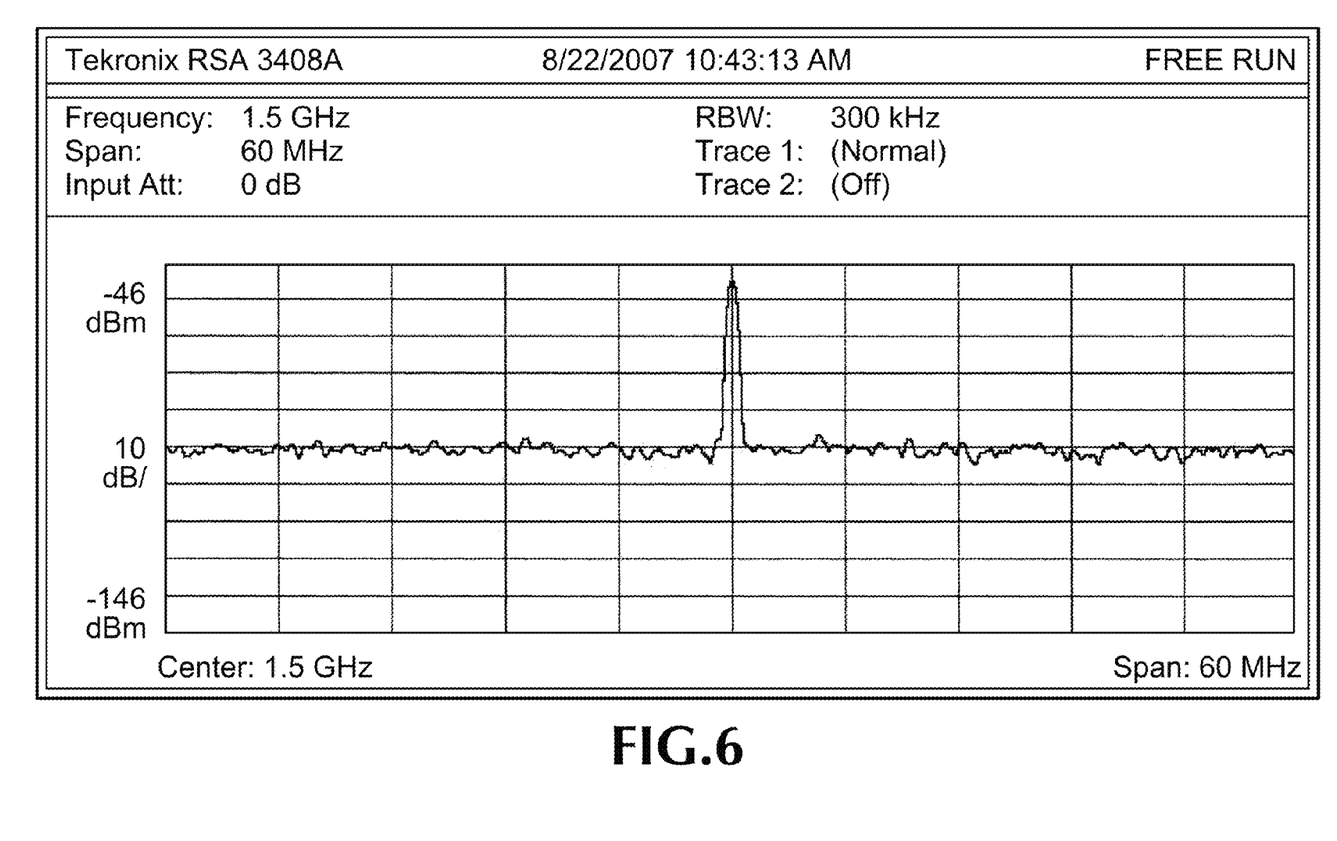
FIG. 6 shows the spectrum of a clock signal without any modulation as per one embodiment of the present invention.
Figure 7:
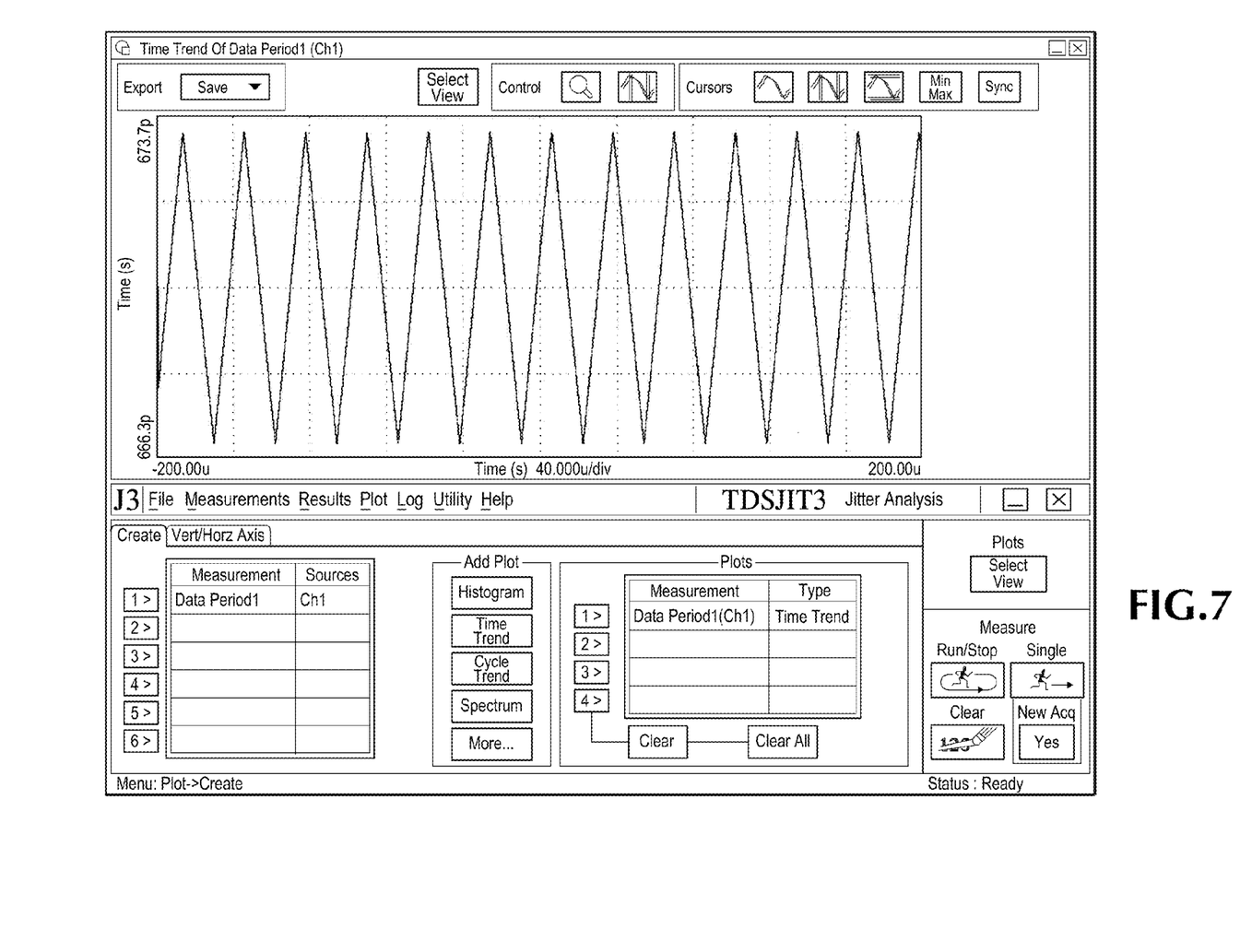
FIG. 7 shows the time trend of SSC modulated waveform with linear modulation as per one embodiment of the present invention
Figure 8:
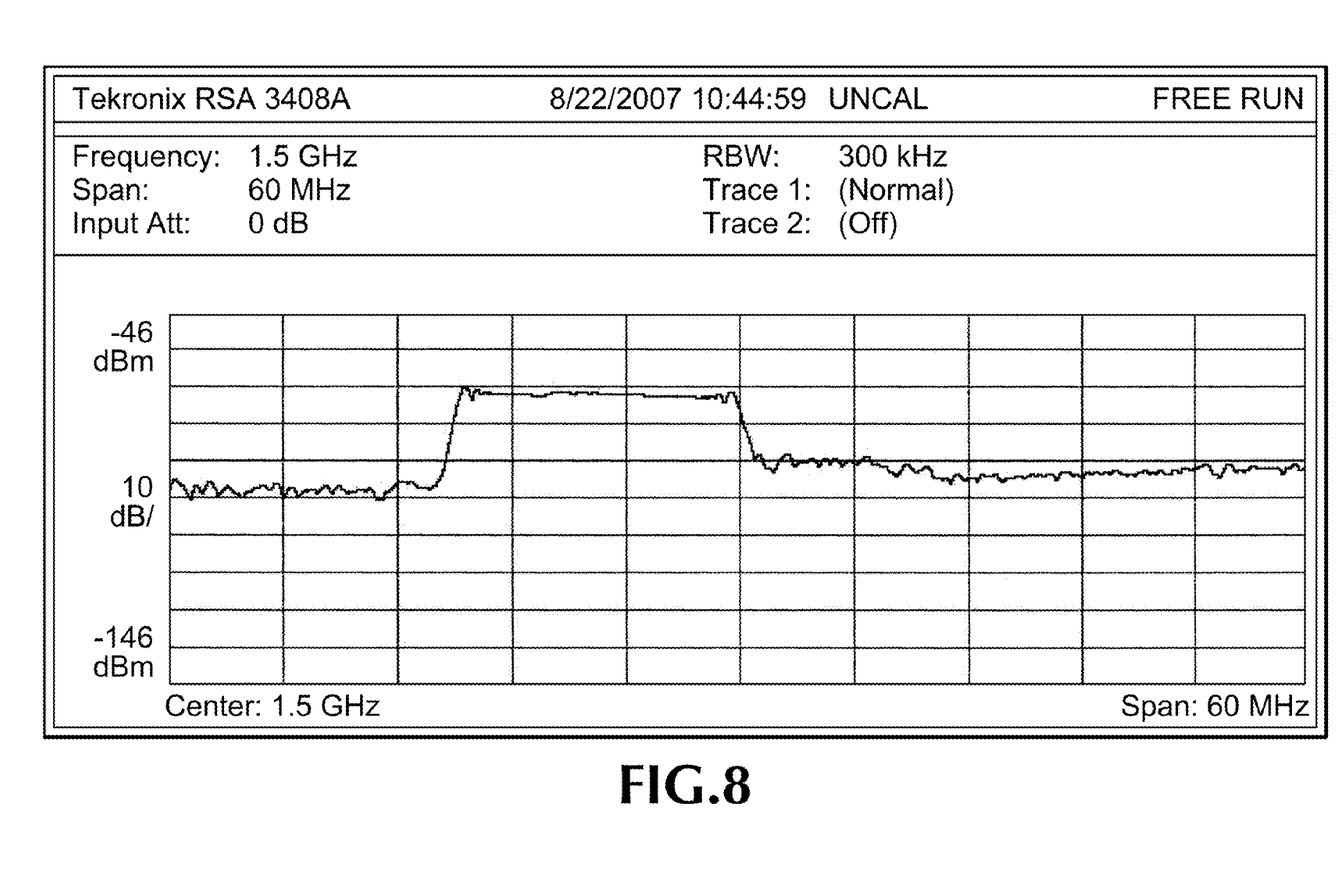
FIG. 8 shows the spectrum of SSC modulated waveform with linear modulation as per one embodiment of the present invention.
Figure 9:
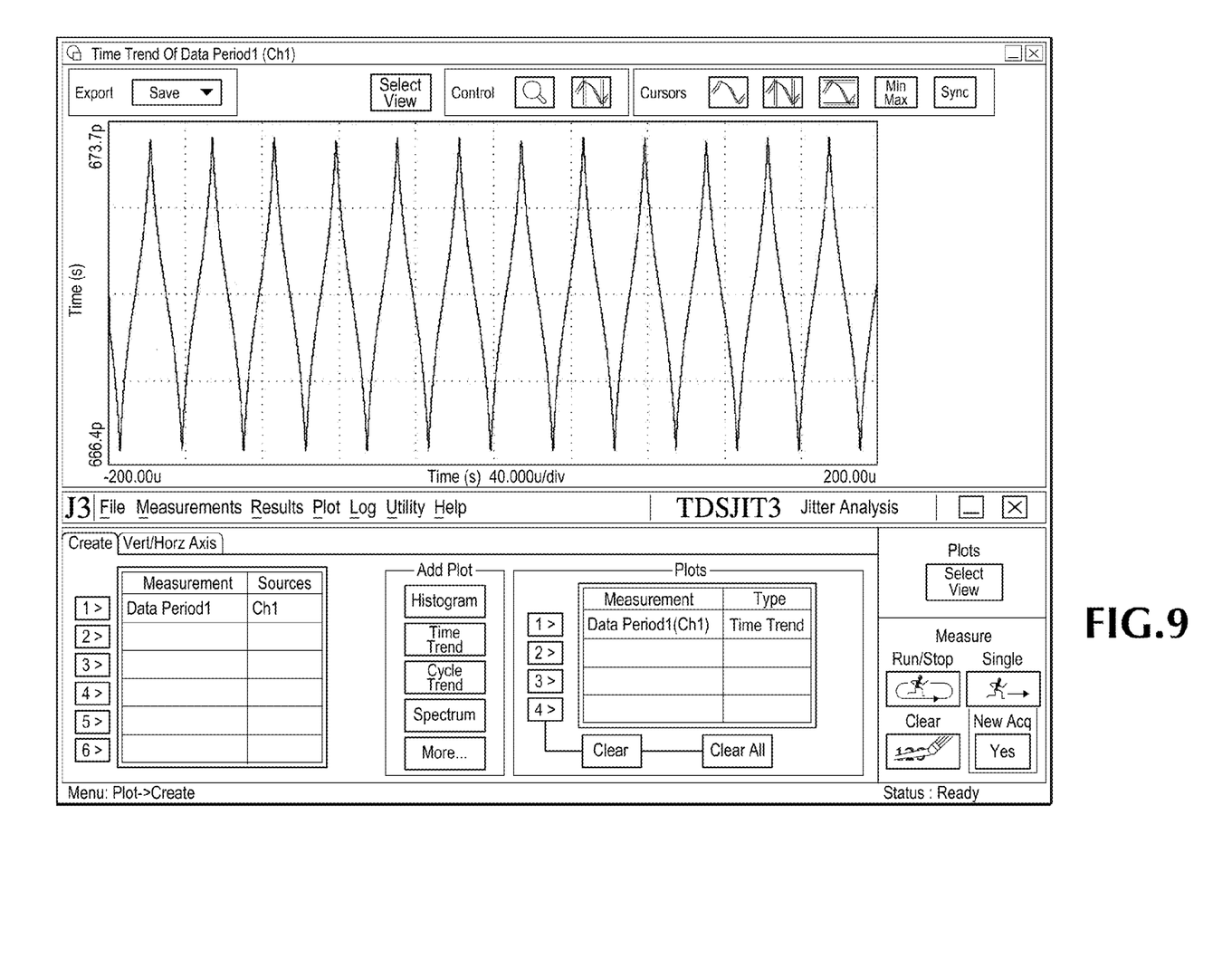
FIG. 9 shows time trend of SSC modulated waveform with non linear modulation as per one embodiment of the present invention.
Figure 10:
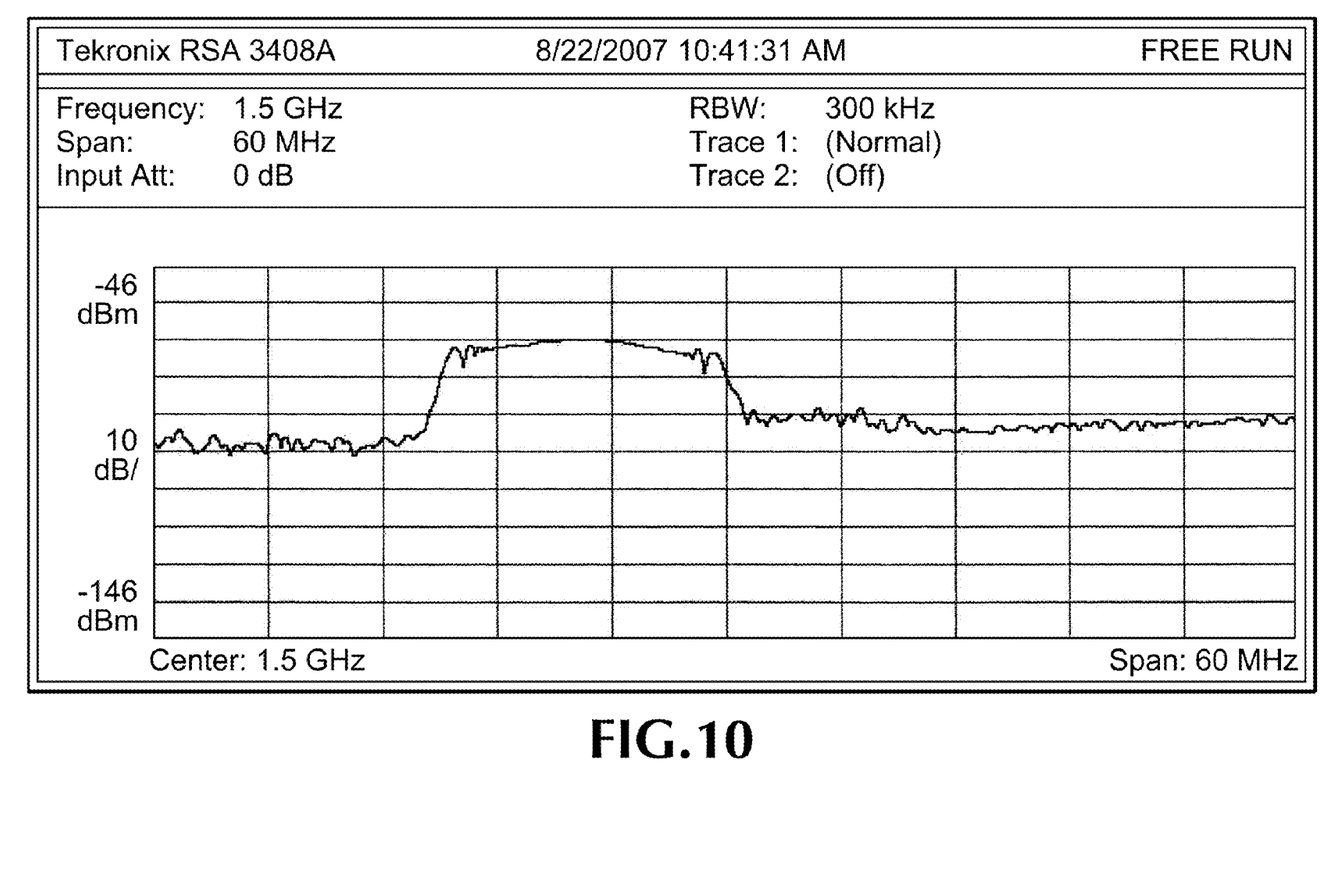
FIG. 10 shows spectrum of SSC modulated waveform with on linear modulation as per one embodiment of the present invention.

The various FIGURES show the various spectrums and time trends in the process. FIG. 6 shows the spectrum of a clock signal without any modulation. Further FIG. 7 shows time trend of SSC modulated waveform with linear modulation. FIG. 8 shows the spectrum of SSC modulated waveform with linear modulation. FIG. 9 shows the time trend of SSC modulated waveform with non linear modulation while FIG. 10 shows the spectrum of SSC modulated waveform with non linear modulation.

The method of the present invention may be implemented using various signal processing tools for example, MATLAB. Further, the method may be distributable as a part of an application running on AWG. Further, as the system and method overcomes any human interpretation errors the method and system provides accuracy and reduction in errors. Also, the present invention provides a simple to use and less expensive method and system for providing SSC modulated signal, which can be used for a DUT.

We claim:

1. A method for use in an Arbitrary Waveform Generator (AWG) for synthesizing and generating an SSC modulated signal comprises the steps of:
   generating a modulating waveform with a frequency of an SSC modulation frequency;
   calculating the number of samples per data bit (SPUI) as a ratio of an upsampling frequency to data rate of a data stream;
   calculating an amplification factor as the ratio of SSC deviation frequency to data rate of the data stream;
   generating an array of SSC Edges containing an edge variation with respect to a single sample per bit, and multiplying the amplification factor to the modulating waveform;
   generating the array SSC Edges Upsampled, containing the edge variations with respect to an Upsample factor per bit, and multiplying SSC Edges with SPUI;
   calculating a resultant bit duration (SSC Bit Duration) as the sum of SSC Edges Upsampled and SPUI;
   calculating the successive summation of SSC Bit Duration, to get SSC Bit Position;
   storing the calculated results as a file in an AWG format in a memory of said AWG;
   reading said file and generating the SSC modulated waveform in response thereto;
   connecting an output terminal of said AWG to an input terminal of a device under test; and
   applying said generated SSC modulated signal to said input terminal of said device under test via said connection.

2. The method of claim 1, wherein the modulating waveform is a linear triangular waveform.

3. The method of claim 1, wherein if the modulation required is or non-linear SSC modulation then the generation of modulating waveform is followed by following step:
   Calculating a tangent of an array of samples of the triangular waveform to get a non-linear SSC waveform.

4. The method of claim 1, wherein the modulation frequency has an amplitude of 2 Volts peak to peak.

\* \* \* \* \*